(12) United States Patent
Kllibarda

(10) Patent No.: US 8,713,799 B2
(45) Date of Patent: May 6, 2014

(54) VEHICLE BODY ASSEMBLY AND SEQUENCING METHOD

(75) Inventor: Vellbor Kllibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 1020 days.

(21) Appl. No.: 12/760,146

(22) Filed: Apr. 14, 2010

(65) Prior Publication Data

US 2010/0263191 A1 Oct. 21, 2010

Related U.S. Application Data

(60) Provisional application No. 61/169,553, filed on Apr. 15, 2009.

(51) Int. Cl.
*B23P 11/00* (2006.01)
*B23Q 7/00* (2006.01)

(52) U.S. Cl.
USPC ............ 29/897.2; 29/430; 29/460; 29/559; 29/822; 29/824

(58) Field of Classification Search
USPC ........ 29/897.2, 430, 460, 559, 783, 784, 791, 29/799, 822, 824
See application file for complete search history.

(56) References Cited

U.S. PATENT DOCUMENTS

| | | |
|---|---|---|
| 3,719,295 A | 3/1973 | Grace |
| 4,195,347 A | 3/1980 | MacMunn et al. |
| 4,883,401 A | 11/1989 | Kavieff |
| 4,928,383 A * | 5/1990 | Kaczmarek et al. ............ 29/711 |
| 4,937,929 A * | 7/1990 | Nokajima et al. ............... 29/430 |
| 5,044,541 A * | 9/1991 | Sekine et al. .................... 228/6.1 |
| 5,319,840 A * | 6/1994 | Yamamoto et al. ............. 29/430 |
| 5,433,292 A | 7/1995 | Haymore et al. |
| 5,435,684 A | 7/1995 | Pipes |
| 5,460,475 A | 10/1995 | Lloyd et al. |
| 5,650,703 A | 7/1997 | Yardley et al. |
| 5,699,281 A | 12/1997 | Crucius et al. |
| 5,798,920 A | 8/1998 | Crucius et al. |
| 5,813,816 A | 9/1998 | Lloyd et al. |
| 5,815,085 A | 9/1998 | Schneider et al. |
| 5,838,572 A | 11/1998 | Hofstetter et al. |
| 5,839,873 A | 11/1998 | Lloyd et al. |
| 6,089,819 A | 7/2000 | Barnes |
| 6,141,598 A | 10/2000 | Nam |
| 6,145,180 A * | 11/2000 | Kogai et al. ..................... 29/429 |
| 6,202,587 B1 | 3/2001 | Stewart |
| 6,226,848 B1 * | 5/2001 | Kurtz ........................ 29/407.01 |
| 6,324,749 B1 | 12/2001 | Katsuura et al. |
| 6,344,629 B1 | 2/2002 | Kato et al. |

(Continued)

FOREIGN PATENT DOCUMENTS

| | | |
|---|---|---|
| JP | 05155369 A | 6/1993 |
| JP | 2004283989 A | 10/2004 |

*Primary Examiner* — Jermie Cozart
(74) *Attorney, Agent, or Firm* — Young Basile Hanlon & MacFarlane P.C.

(57) ABSTRACT

A vehicle body assembly and sequencing system includes the advantages of a batch vehicle body build sequence with the advantages of a random sequence of vehicle body styles transferred to a painting area. The build system includes using automated guided vehicles which transfer and store assembled, un-painted vehicle bodies in a storage area and sequentially transfers selected bodies from the storage area to the painting area achieving a random or variable supply of different vehicle bodies to be painted a certain color.

15 Claims, 9 Drawing Sheets

(56) References Cited

U.S. PATENT DOCUMENTS

| | | |
|---|---|---|
| 6,494,304 B1 | 12/2002 | Jaynes et al. |
| 6,915,571 B2 * | 7/2005 | Hosono et al. ............... 29/897.2 |
| 6,918,168 B2 | 7/2005 | Moriya et al. |
| 7,011,487 B2 | 3/2006 | Kafka et al. |
| 7,269,900 B2 | 9/2007 | Moriya et al. |
| 7,311,171 B2 | 12/2007 | Seki et al. |
| 7,577,485 B2 | 8/2009 | Onizawa et al. |
| 2002/0146305 A1 * | 10/2002 | Haag ............................. 414/228 |
| 2003/0051335 A1 * | 3/2003 | Nakamura ....................... 29/711 |
| 2005/0182505 A1 | 8/2005 | Onizawa et al. |
| 2005/0198803 A1 | 9/2005 | Moriya et al. |
| 2006/0226197 A1 * | 10/2006 | Degain et al. ................ 228/49.6 |
| 2008/0189005 A1 | 8/2008 | Chilson et al. |
| 2008/0199298 A1 | 8/2008 | Chilson et al. |
| 2009/0078741 A1 | 3/2009 | Sata et al. |

* cited by examiner

| RANDOM MIX IN BIW | | | | | MIX TO PAINT |
|---|---|---|---|---|---|
| # | A | B | C | D | MIX TO PAINT |
| 1 | 1 | | | | 1 |
| 2 | | | 2 | | 2 |
| 3 | 3 | | | | 3 |
| 4 | | | | 4 | 4 |
| 5 | | 5 | | | 5 |
| 6 | 6 | | | | 6 |
| 7 | | | | 7 | 7 |
| 8 | | | 8 | | 8 |
| 9 | | | | 9 | 9 |
| 10 | 10 | | | | 10 |
| 11 | | 11 | | | 11 |
| 12 | | | | 12 | 12 |
| 13 | 13 | | | | 13 |
| 14 | | | 14 | | 14 |
| 15 | | | | 15 | 15 |
| 16 | 16 | | | | 16 |
| 17 | | 17 | | | 17 |
| 18 | | | | 18 | 18 |
| 19 | 19 | | | | 19 |
| 20 | | | | 20 | 20 |
| 21 | | | 21 | | 21 |
| 22 | | | | 22 | 22 |
| 23 | 23 | | | | 23 |
| 24 | | 24 | | | 24 |
| 25 | | | | | |
| 26 | | | | | |
| 27 | | | | | |
| 28 | | | | | |
| 29 | | | | | |
| 30 | | | | | |
| | 35% | 15 | 15 | 35 | |

FIG. 2
PRIOR ART

| BATCH BUILD IN BIW | | | PRE-PAINT SRS | MIX TO PAINT | |
|---|---|---|---|---|---|
| # | BATCH | | | | MIX TO PAINT |
| 1 | 1 | A | | 1 | 1 |
| 2 | 3 | A | | 2 | 2 |
| 3 | 8 | A | | 3 | 3 |
| 4 | 10 | A | | 4 | 4 |
| 5 | 13 | A | | 5 | 5 |
| 6 | 16 | A | | 6 | 6 |
| 7 | 19 | A | | 7 | 7 |
| 8 | 23 | A | A | 8 | 8 |
| 9 | | A | | 9 | 9 |
| 10 | | A | | 10 | 10 |
| . | | A | | 11 | 11 |
| . | | A | | 12 | 12 |
| . | | A | | 13 | 13 |
| n | n | A | | 14 | 14 |
| n+1 | 5 | B | | 15 | 15 |
| n+2 | 11 | B | | 16 | 16 |
| n+3 | 17 | B | | 17 | 17 |
| n+4 | 24 | B | | 18 | 18 |
| . | | B | B | 19 | 19 |
| . | | B | | 20 | 20 |
| . | | B | | 21 | 21 |
| . | | B | | 22 | 22 |
| m | m | B | | 23 | 23 |
| m+1 | 4 | D | | 24 | 24 |
| m+2 | 7 | D | | 25 | |
| m+3 | 9 | D | | 26 | |
| m+4 | 12 | D | | 27 | |
| m+5 | 15 | D | C | 28 | |
| m+6 | 18 | D | | 29 | |
| m+7 | 20 | D | | 30 | |
| m+8 | 22 | D | | | |
| . | | D | | | |
| . | | D | | | |
| . | | D | | | |
| p | p | D | | | |
| p+1 | 2 | C | | | |
| p+2 | 8 | C | | | |
| p+3 | 14 | C | D | | |
| p+4 | 21 | C | | | |
| . | | C | | | |
| . | | C | | | |
| . | | C | | | |
| q | q | C | | | |

FIG. 3

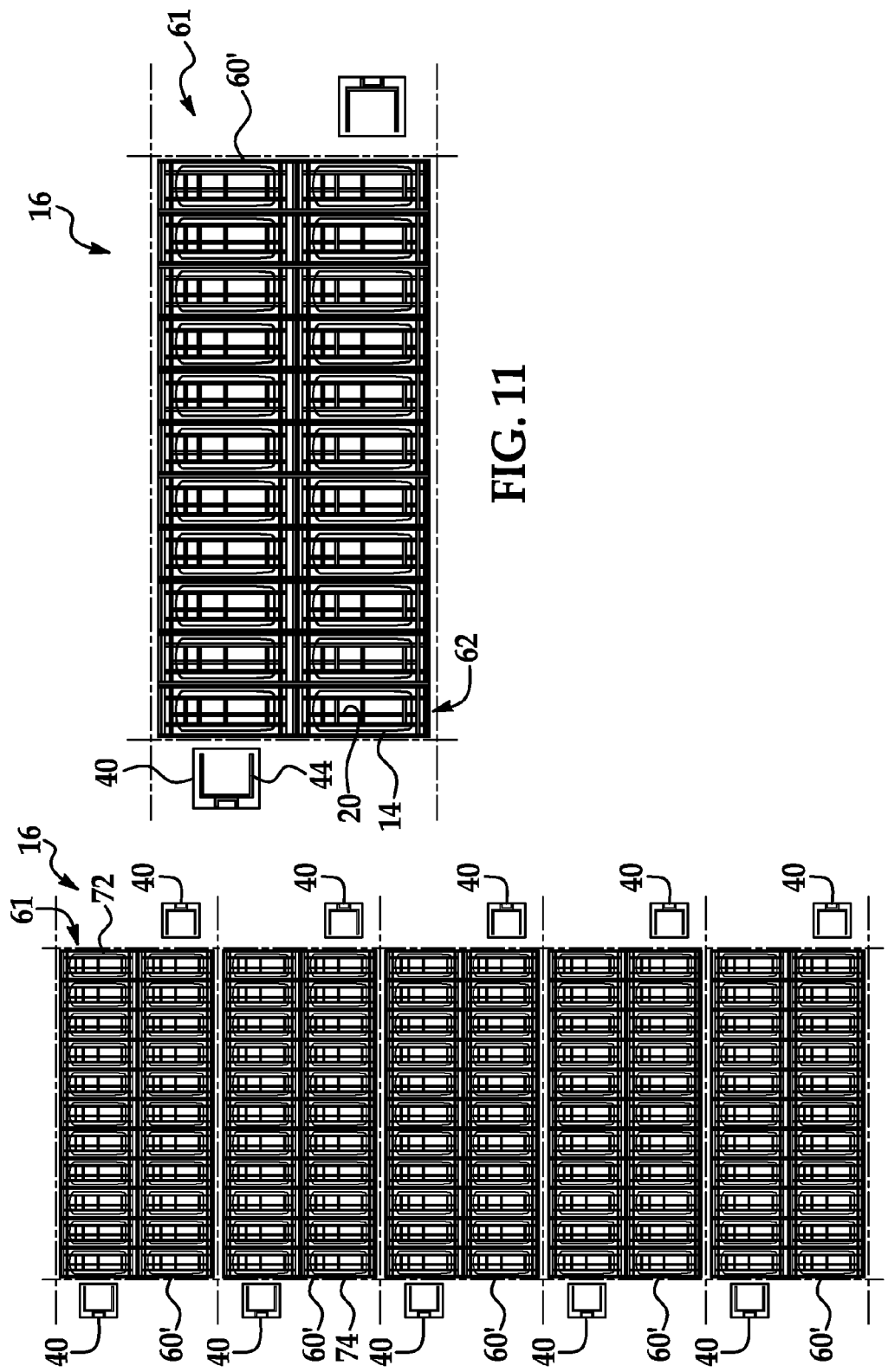

VEHICLE BODY ASSEMBLY AND SEQUENCING METHOD

CROSS-REFERENCE TO RELATED APPLICATIONS

This application claims priority to U.S. Provisional Application Ser. No. 61/169,553, filed Apr. 15, 2009, which is hereby incorporated by reference in its entirety.

TECHNICAL FIELD

The invention generally relates to the field of vehicle body assembly, transfer and logistical sequencing prior to exterior painting of the vehicle body.

BACKGROUND

The structural skeleton of a vehicle, typically made from welded sheet metal components, is generally referred to in the industry as a body-in-white (BIW), due to the sheet metal being initially coated in a rust retardant coating which is often white in color, prior to being painted the exterior color of the vehicle. It is also common in the industry for vehicle assembly plants to have flexible assembly lines which are capable of relatively quick changes to build different body style of vehicles to support production needs.

Multiple models of vehicle BIWs can be assembled in a "batch mix" or a "random mix". In a batch assembly mix, all BIWs of a first type of vehicle model are assembled, then all BIWs of a second type of vehicle model are assembled, and so on. Assembling multiple models of vehicles in a batch mix can be advantageous because the number of tooling changes can be kept low, as a tooling change only needs to be undertaken when switching between assembling different models of vehicles. As an example, if there are seven different models of vehicles in a batch mix, six tooling changes are necessary to assemble all the vehicles in the batch mix assuming the tooling is initially set up for a first of the seven models.

In a random vehicle body assembling mix, the order in which BIWs for various models of vehicles are assembled is based on the color that the BIWs are to be painted. For example, a build that includes three different types of vehicle models, each of which includes vehicles of two colors, red and blue. In this example, bodies-in-white of a first type of vehicle model to be painted red are assembled, then bodies-in-white of a second type of vehicle model to be painted red are assembled, then bodies-in-white of a third-type of vehicle to be painted red are assembled. Next, a paint change is undertaken to change the color of paint to be applied from red to blue. After the paint change, bodies-in-white of the first type of vehicle model to be painted blue are assembled, then bodies-in-white of the second type of vehicle model to be painted blue are assembled, then bodies-in-white of the third-type of vehicle to be painted blue are assembled. Assembling different models of vehicle in a random mix can be advantageous because the number of paint changes can be kept low, as the number of paint changes can be one fewer than the total number of colors assuming the paint is initially set up for a first color.

Painting vehicles assembled in a batch build or assembly mix can be problematic because all bodies-in-white of a certain type of vehicle model are not typically painted the same color. One solution to this problem is to paint the bodies-in-white in the order in which they are assembled and to change the color of paint as necessary. However, this solution requires a large number of paint changes, and paint changes are time consuming and expensive.

Further, assembling vehicles in a random mix can be problematic because a large number of tooling changes are typically required. For example, the number of tool changes increases as the number of paint colors increases. The number of tooling changes required for a random mix is approximately equal to the total number of colors multiplied by the number of vehicle models.

SUMMARY

Examples of a vehicle body assembly and sequencing system as described herein can include assembling vehicle bodies-in-white (BIWs) in a batch mix, storing the assembled BIWs, and removing the assembled BIWs from storage in an order based on the color that the bodies-in-white are to be painted.

In one example of the vehicle body assembly and sequencing system, vehicle BIWs can be assembled along one or more assembly lines in a batch mix, with all models of a first type of vehicle body assembled in one batch, all models of a second type assembled in another batch, and so on. Each assembled BIW can be transferred from an end of its assembly line to a storage rack by an automated guided vehicle (AGV). The BIWs can be organized in the storage rack by, for example, model type or color to be painted. Another AGV can selectively remove BIWs from the storage rack and transfer them to a painting area where the BIWs are to be painted the desired exterior color. Preferably, the BIWs are selectively removed from the storage rack based on the color that they are to be painted to achieve the desired "random mix" to paint. That is, all bodies-in-white to be painted a first color, regardless of body style, can be removed from the storage rack and transferred to the painting area, following by all bodies-in-white to be painted a second color, and so on.

The present system offers numerous and significant advantages over prior systems which typically required random build mixes in order to achieve the desired random mix of body styles to paint so as to minimize paint color changes. Although advantageous on the painting side, the random build or assembly mix required was difficult, time consuming and expensive. The present system provides for the desired random vehicle body styles to paint, but permits the desired batch build which greatly reduces complexity, coordination, time and money on the build process side. Through use of the present system, sequencing and storage of the BIWs, quality build and paint processes are achieved while maintaining quality and integrity of the BIWs which serves as the foundation for the entire vehicle.

BRIEF DESCRIPTION OF THE DRAWINGS

The description herein makes reference to the accompanying drawings wherein like reference numerals refer to like parts throughout the several views, and wherein:

FIG. 2 is a schematic chart of an example of a prior art random build mix and chart of the built vehicle body sequence to the painting area;

FIG. 3 is a schematic chart of an example of the present invention batch vehicle build sequence, an exemplary storage sequence and built vehicle body sequence from the storage area to the painting area;

FIG. 10 is a plan view of five exemplary storage racks, each rack positioned in a storage bay, for storing 330 vehicle bodies awaiting painting;

FIG. 11 is an enlarged plan view of one of the storage racks in FIG. 10; and

DETAILED DESCRIPTION

Figure 1:
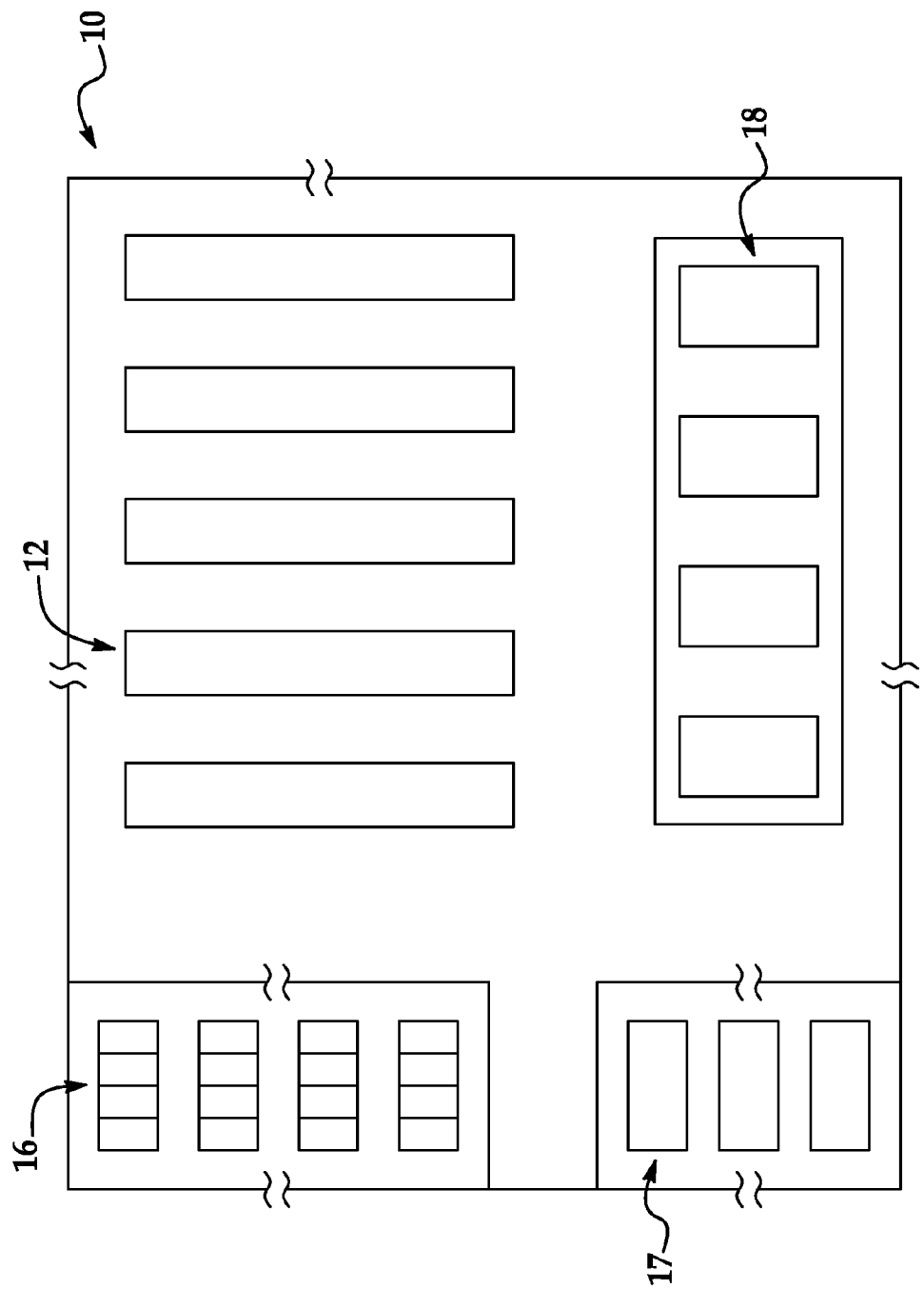
FIG. 1 is a plan view of an example of a manufacturing facility including various body-in-white assembly lines, a body-in-white storage area, and a vehicle body painting area.
Figure 4:
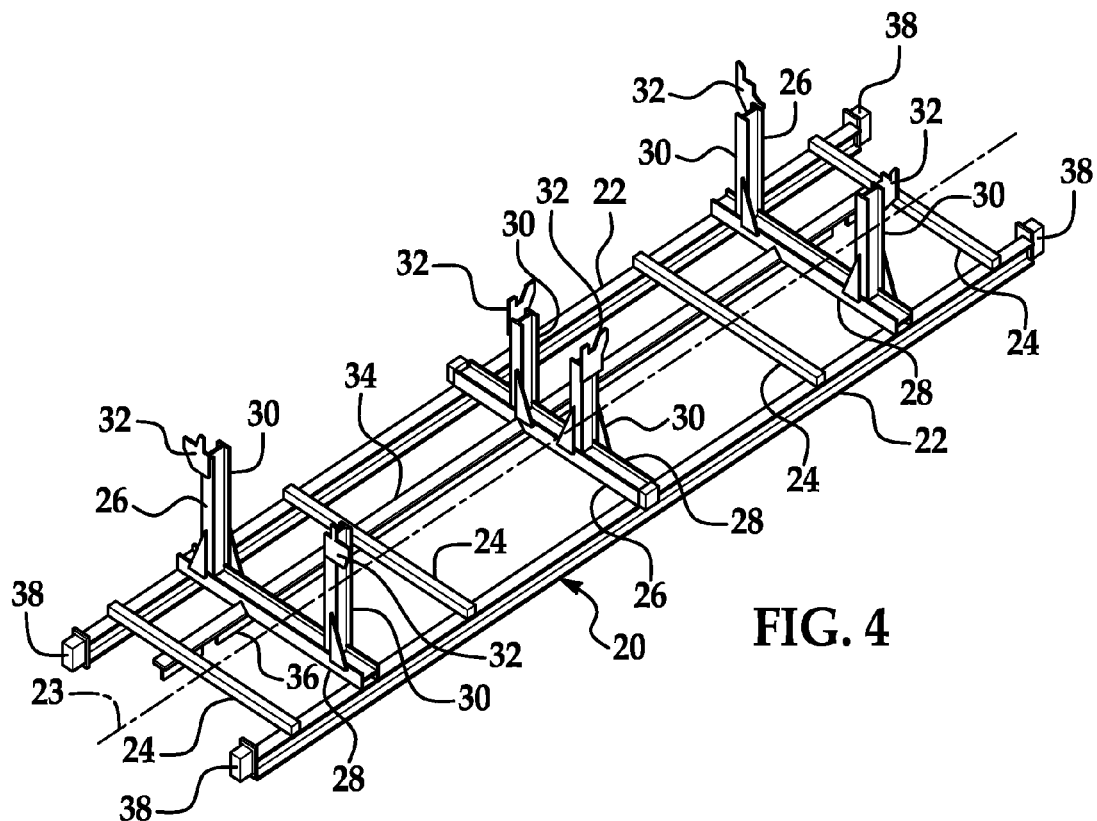
FIG. 4 is a perspective view of an example of a vehicle body pallet.
Figure 5:
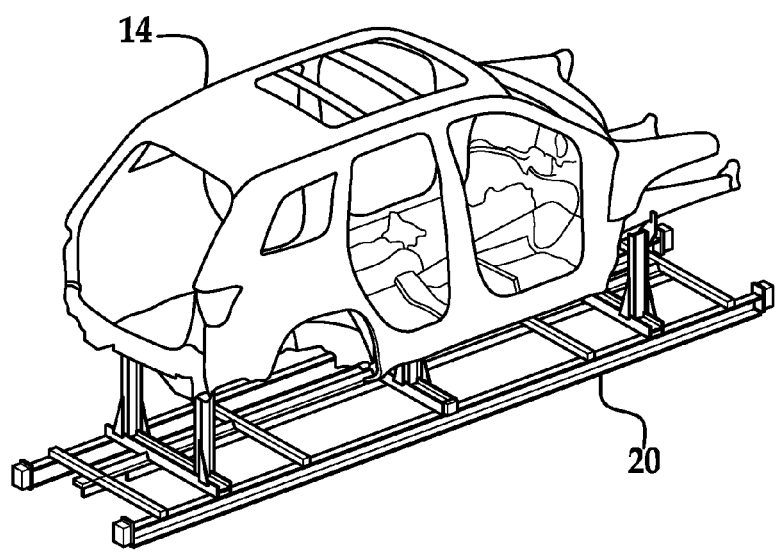
FIG. 5 is a perspective view of the pallet of FIG. 4 carrying an example of a vehicle body-in-white.
Figure 6:
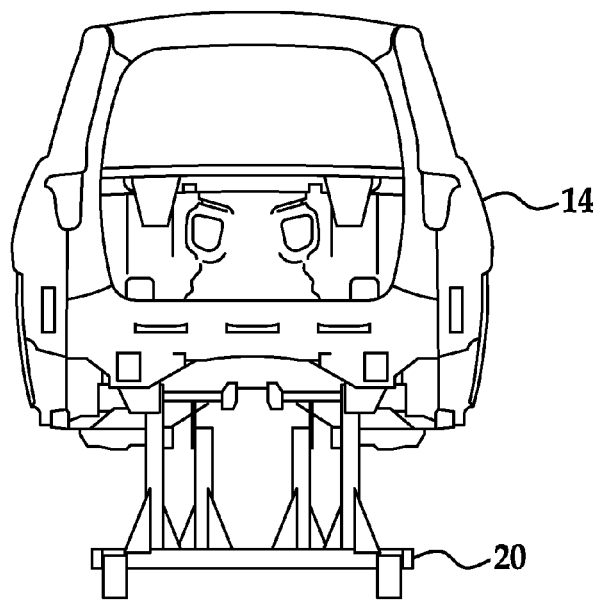
FIG. 6 is a rear elevation view of the pallet and vehicle body-in-white of FIG. 5.

Examples of a vehicle body assembly and sequencing system are discussed herein with reference to FIGS. 1-12. As shown in FIG. 1, an example of a manufacturing facility 10 can include various assembly lines 12 for at least partially assembling, for example, vehicle bodies-in-white (BIWs) 14, which are generally shown in FIGS. 5 and 6. The manufacturing facility 10 can also include a vehicle body storage area 16, automated guided vehicle (AGV) storage and coordination area 17 and a vehicle body painting area 18.

Each assembly line 12 can include work stations connected by a track (not shown) along which the BIWs 14 can be moved and sequenced through the various build and assembly operations. Automated robots or workers at each work station can perform operations, such as welding, clamping, gluing and/or bolting operations, on the BIWs 14 or parts which eventually form the BIWs 14. Each BIW 14 can be supported and carried on a pallet 20 shown in FIG. 4 while being moved along the assembly line 12. Alternately, each BIW 14 can be positioned on the pallet 20 at the end of one of the assembly lines 12 by, for example, an automated robot.

Tool changes can be performed such that the assembly lines 12 can assemble different vehicle body style models of BIWs 14, such as a first model, a second model, and a third model of BIW 14. Each tool change can involve changing end effectors, for example a clamp, weld gun etc., on automated robots, repositioning automated robots, and/or other tool alterations. In a preferred example generally shown in FIG. 3, the assembly lines 12 assemble the BIWs 14 in a batch mix, assembling all models of the first type (A) in one batch, all models of the second type (B) in a subsequent batch, and so on. Tool changes can be performed between assembling different batches of vehicles, if necessary. For example, a first tool change can be performed between assembling batches of the first and second models of BIWs 14, and a second tool change can be performed between assembling batches of the second and third models of BIWs 14.

As shown in FIG. 2, a typical random build sequence and sequence of vehicle bodies to paint is shown. In the first column, an example of 24 vehicles (numbered 1-24) are scheduled to be assembled along assembly lines 12. A total of 4 different vehicle body styles are needed (A, B, C and D). In order to achieve the desired body style and number of vehicles going to be painted a certain color, it was predetermined before the build what body styles were going to be painted a certain color and how many of that body style, for example as shown in the second column of FIG. 3. Under typical prior art build and sequencing processes, a "random" vehicle body build was established so the proper body style and numbers of vehicles would be sent to paint. In other words, the less desirable "random" build sequence, requiring complex organization and many tooling changes, was used to achieve the desirable body style mix to paint.

As shown in FIG. 3, the present invention allows for the desired body style mix to paint (shown in the second column, which is the same as the mix to paint in FIG. 2), but uses the desirable "batch" body build sequence and selected storage areas (A, B, C and D) (shown in the second column of FIG. 3) between assembly and before the vehicles are sent to paint, to achieve the desired process both on the assembly and paint process areas. A further explanation of the present system is explained and illustrated below.

Referring now to FIGS. 4-6, an exemplary vehicle support pallet 20 can include a pair of parallel, spaced apart longitudinal rails 22 positioned along a longitudinal axis 23. One or more transverse beams 24 extending between and welded, bolted or otherwise attached to the longitudinal rails 22. One or more support structures 26 can be disposed longitudinally inward from the longitudinal ends of the pallet 20, and each support structure 26 can extend transversely between the longitudinal rails 22. Each support structure 26 can include a transverse rail 28 welded, bolted or otherwise attached to the longitudinal rails 22, and each support structure 26 can also include a pair of vertical beams 30 welded, bolted or otherwise attached to and extending orthogonally from its transverse rail 28. Distal ends of the vertical beams 30 can include respective locating pins 32 for insertion into apertures in the BIW 14 to locate and support the BIW 14 relative to the pallet 20 as shown in FIGS. 5 and 6. A longitudinal beam 34 can extend parallel to the longitudinal rails 22 at a location between the rails 22 in the transverse direction, and the longitudinal beam 34 can be welded, bolted, or otherwise attached to one or more of the transverse beams 24 and the support structures 26. The longitudinal beam 34 can include a guide flange 36 extending orthogonally from the longitudinal beam 34, and the guide flange 36 can be used to engage, as an example, the track along one of the assembly lines 12 for guiding the pallet 20 and BIW 14 along the assembly line 12.

Figure 8:
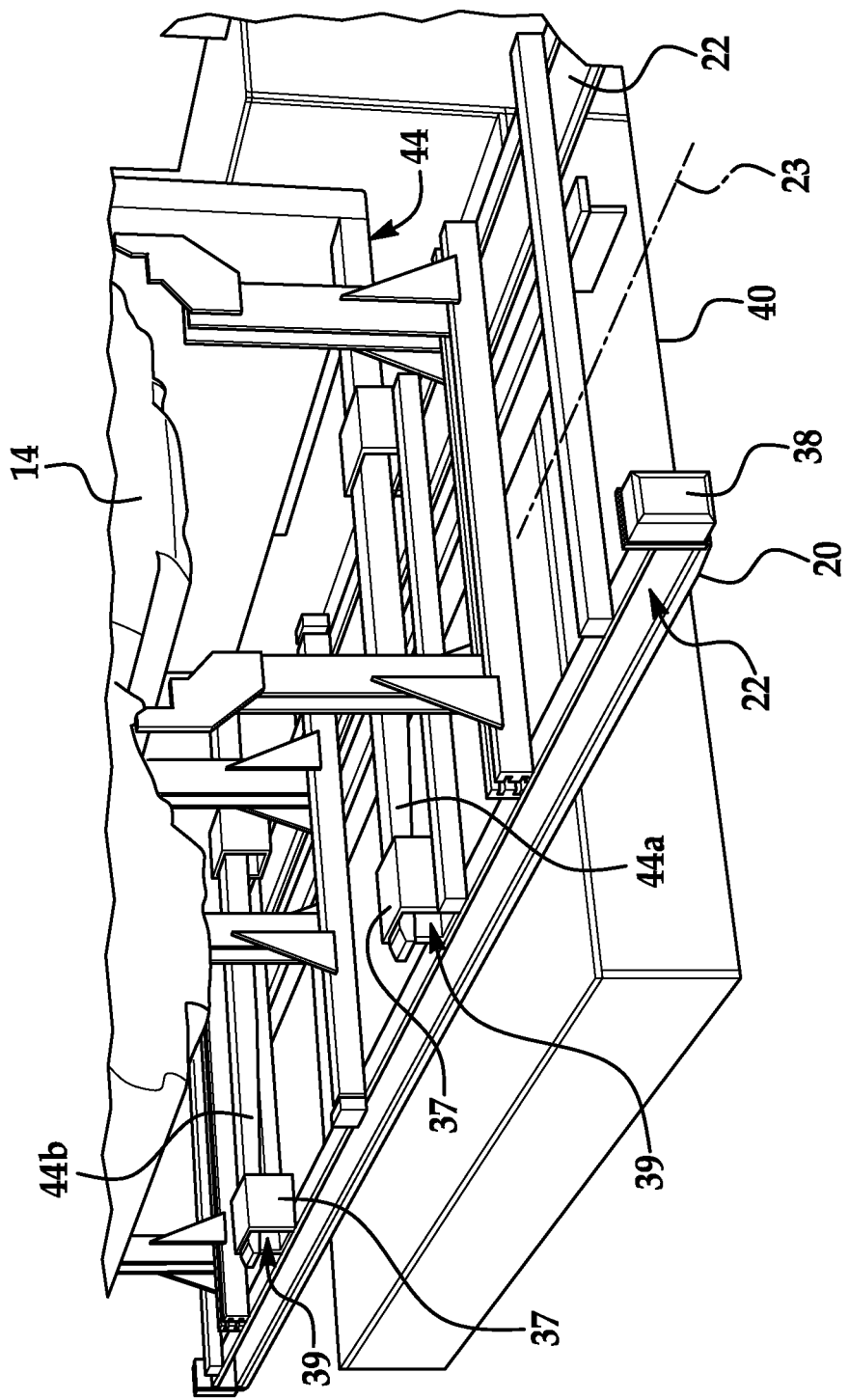
FIG. 8 is a perspective view of the pallet of FIG. 5 being carried by the AGV of FIG. 7.

As shown in FIGS. 4 and 8, a pad 38, which can be made of rubber or another flexible material, can be disposed over the longitudinal end of each longitudinal rail 22. The pad 38 can offer protection as a result of contact between the pallet 20 and another structure by at least partially absorbing an impact. As best seen in FIG. 8, the pallet 20 can include blocks 37 defining respective apertures 39, with two blocks 37 being positioned along each longitudinal rail 22 and the aperture openings oriented generally transverse to longitudinal axis 23. The blocks 37 on one of the rails 22 can be aligned with the blocks 37 on the other rail 22 in the transverse direction.

Figure 7:
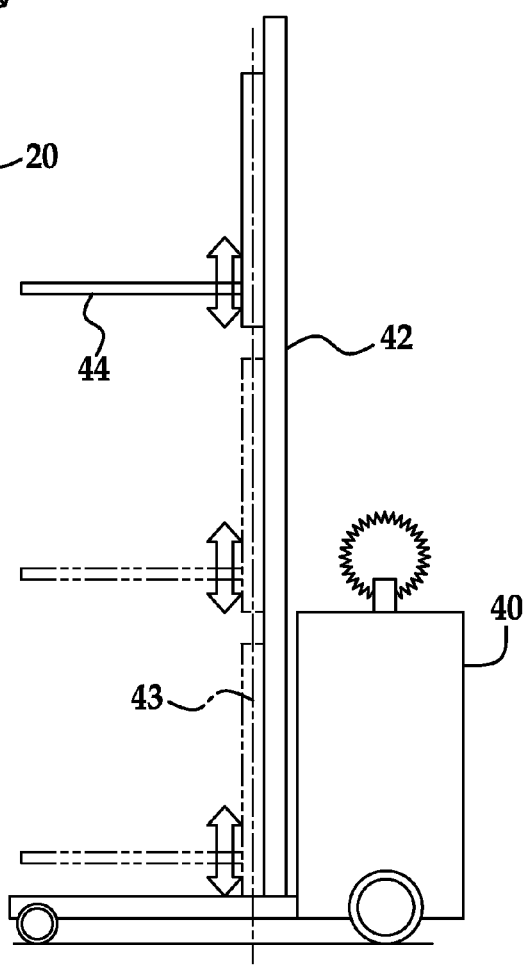
FIG. 7 is a side elevation view of an example of an automated guided vehicle (AGV) usable with an example of a vehicle body storage rack.

An example of an automated guided vehicle (AGV) 40 as shown in FIG. 7 can include a lift mechanism 42 having a pronged fork 44, which is shown in three positions along the lift mechanism 42 in FIG. 7 to illustrate the vertical movement capability of the pronged fork 44 along an axis 43. The lift mechanism 42 can be telescoping and can be pneumatically actuated, chain-driven, or otherwise actuated. The AGV 40 can include one or more motors for driving the AGV 40 and actuating the lift mechanism 42, a controller (e.g., a CPU and memory having software stored thereon) for providing instructions to the motor, and one or more batteries or another power source for powering the one or more motors, the controller, and/or other components of the AGV 40. The AGV 40 can include a wireless network card for wirelessly receiving operating instructions. Alternatively, operating instructions can be programmed into the AGV 40 via, as examples, a port on the AGV 40 for connecting to a programming device, or an interface on the AGV 40. The AGV 40 can be moveable about the manufacturing facility 10 along a path programmed into the controller or determined by the controller (e.g., as a result of input from sensors included on the AGV 40 and/or at various location in the manufacturing facility 10). The path can extend, for example, from a first position or pick-up point at the end of one of the assembly lines 12 and end at a second or drop off point at the vehicle body storage area 16, or alternately from the vehicle body storage area 16 to the vehicle body painting area 18. The controller can instruct the AGV 40 to actuate the lift mechanism 42 to move the fork 44 vertically at certain occasions along the path. Other means for programming, communicating and/or controlling the AGV known by those skilled in the art may be used.

As shown in FIG. 8, the AGV 40 can move such that prongs 44a and 44b of its fork 44 extend through the apertures 39 defined by the blocks 37 on the pallet 20. That is, the AGV 40 can adjust the position of its fork 44 such that the prongs 44a and 44b are aligned vertically with the apertures 39 defined by the pallet 20, and then the AGV 40 can move in a direction transverse of the pallet 20 axis 23 such that the prongs 44a and 44b are inserted through respective apertures 39. The AGV 40 can actuate the lift mechanism 42 to raise the fork 44, causing the prongs 44a and 44b to engage the blocks 39, thereby lifting the pallet 20 and, if mounted on the pallet 20, the BIW 14. These movements can take place, as examples, to pick up the pallet 20 at the end of one of the assembly lines 12, or to pick up the pallet 20 from the vehicle body storage area 16. The AGV 40 can then transport the pallet 20 and BIW 14 from the assembly line 12 to the storage area 16 or from the storage area 16 to the painting area 18 by moving along one of the exemplary paths described above. To remove the pallet 20 from the AGV 40, the AGV 40 can lower the fork 44 such that the pallet 20 is supported on by an object other than the fork 44, and then the AGV 40 can move in the direction transverse to the pallet 20 such that the fork 44 is removed from the blocks 39 of the pallet 20.

Figure 9:
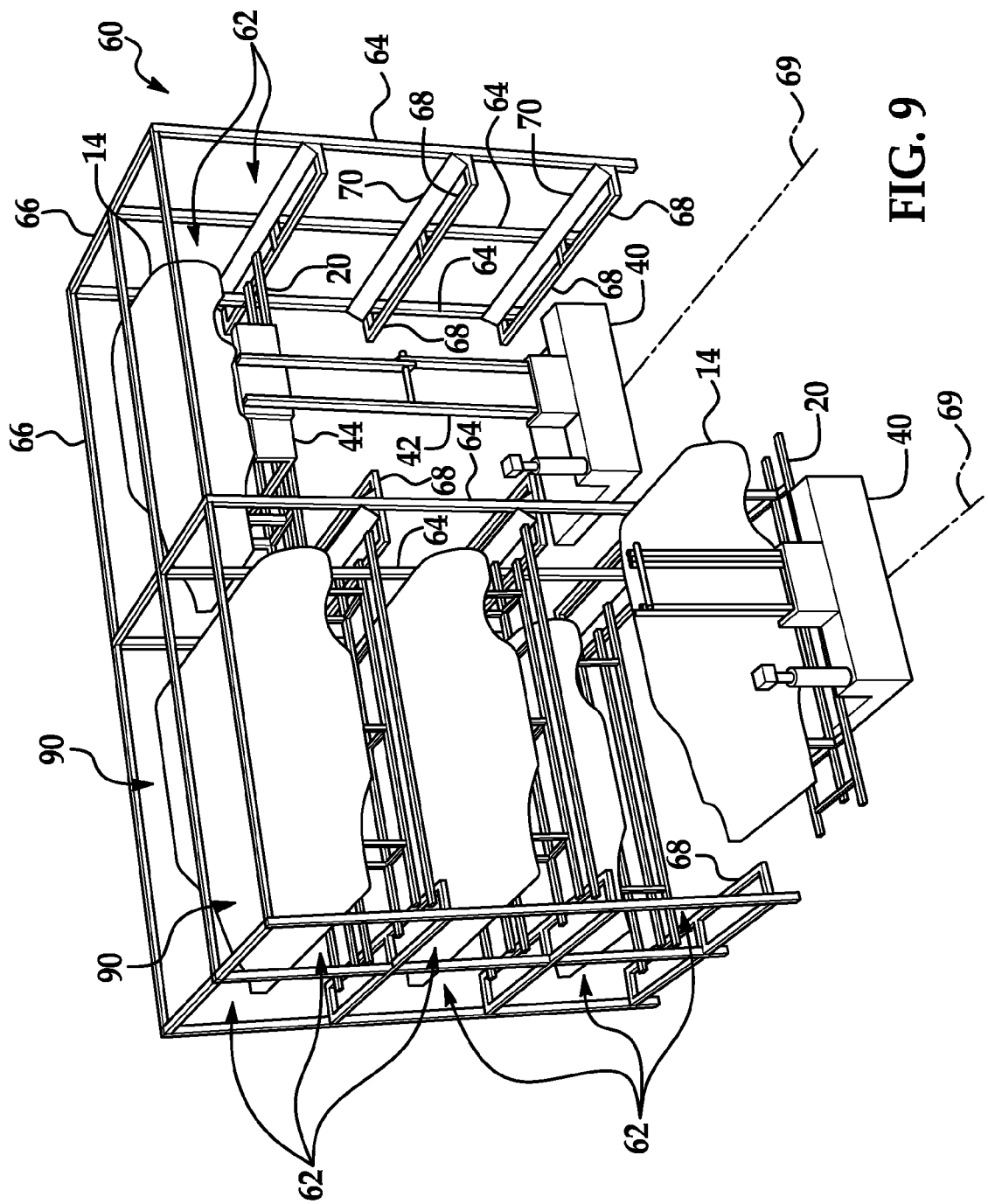
FIG. 9 is a perspective view of an example of a vehicle body storage rack including four columns and two rows of storage compartments.

Referring to FIGS. 9-11, the vehicle body storage area 16 can include one or more storage racks 60, which are suitable for use in a bay 61 in a typical assembly plant. An example of a storage rack 60 is shown in FIG. 9. The storage rack 60 defines multiple compartments 62. Each compartment 62 is sized and oriented to preferably receive a single pallet 20 carrying a BIWs 14. The storage compartments 62 can be arranged side-by-side, end-to-end, and stacked on top of one another such that the frame 60 defines a three dimensional array of compartments 62. The rack 60 as shown in FIG. 9 is two rows of compartments 62 wide, two columns 90 along axis 69 of compartments 62 deep, and three compartments 62 high, thus defining a total of twelve compartments 62. In an alternate example shown in FIG. 11, a rack 60' includes two rows of compartments 62 wide, eleven columns of compartments 62 deep, and three compartments 62 high, for a total of sixty-six compartments 62 per storage rack 60'. As shown in FIG. 10, multiple racks 60' in multiple bays 61 can be included in the storage area 16, with five racks 60' providing for storage of 330 vehicle bodies in compartments 62 in the aggregate. Alternatively, the rack 60 can define a different sized and oriented array of compartments 62 known by those skilled in the field.

Referring back to FIG. 9, the exemplary rack 60 can include vertical beams 64 extending from a floor to a top of the rack 60, with one of the vertical beams 64 being positioned at each corner of a stack of compartments 62. While not shown, the vertical beams 64 can include support bases at their bottom ends, such as planar sheets or other structures offering a wider base for additional support. Connecting beams 66 can extend between the top ends of the vertical beams 64, and the connecting beams 66 can be welded, bolted, or otherwise attached to the vertical beams 64. The connecting beams 66 can enhance the stability of the vertical beams 64. Each compartment 62 can include a pair of cantilevers 68 at opposing ends of the compartment 62. The cantilevers 68 can extend toward one another from the vertical beams 64 at the ends of the bay 62. The cantilevers 68 can be spaced apart in a direction from one end of the compartment 62 to the other by a distance sufficient for the AGV 40 to pass therebetween, which can allow the AGV 40 to travel along axis 69 and pass from one side of the rack 62 to the other side.

Each cantilever 68 can include a flange 70 angled relative the vertical. The flange 70 can provide a surface for the pallet 20 to slide down if the pallet 20 is deposited by the AGV 40 at a position vertically aligned with the flange 70. The space between lower edges of the flanges 70 on the cantilevers 68 at opposing ends of the bay 62 can be equal to the length of the pallet 20, thereby allowing the flanges 70 to center the pallet 20 in the compartment 62.

Figure 12:
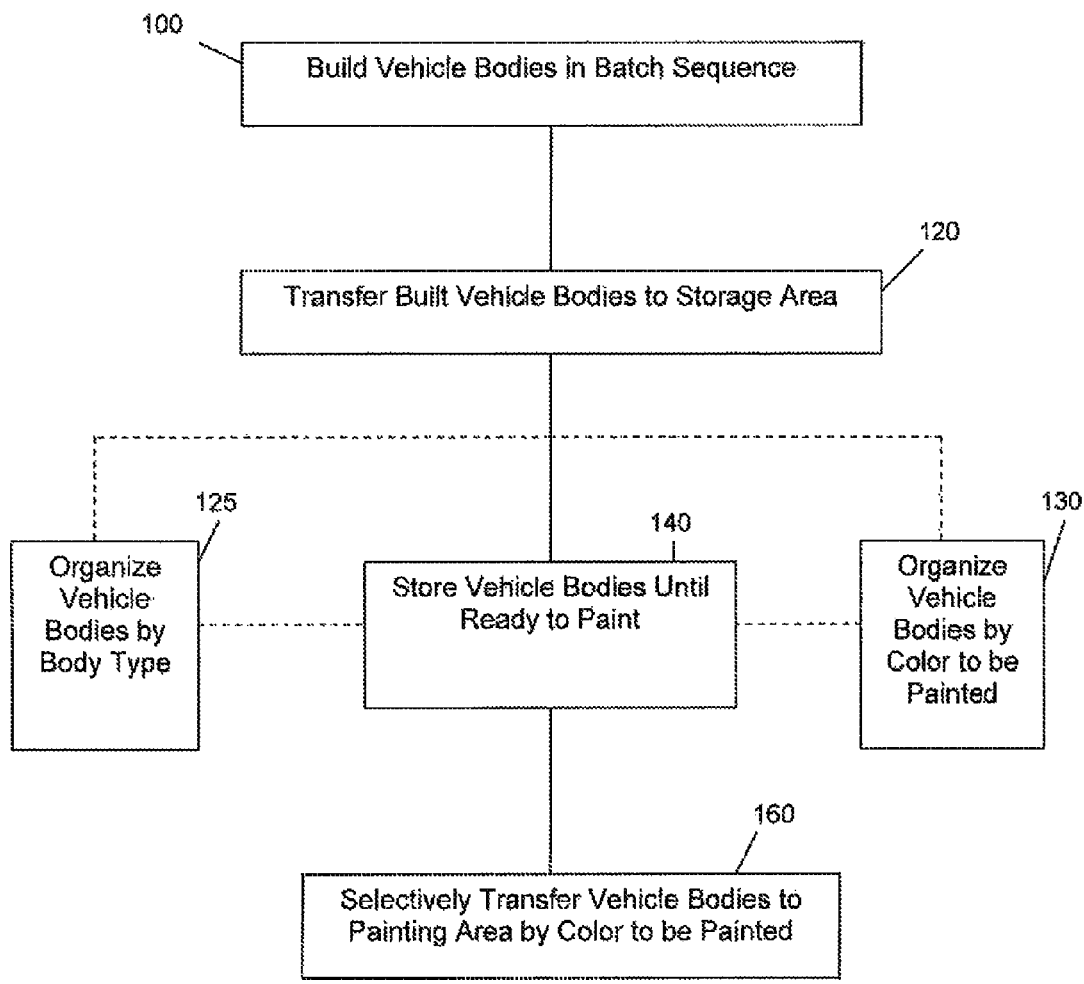
FIG. 12 is a schematic flow chart of an exemplary build and storage sequence of the present invention.

In one example of operation as schematically shown in FIG. 12, during a preferred "batch" vehicle body build process 100, an AGV 40 can pick up the BIW 14 from the assembly line 12 as described above, and at step 120 transport the BIW 14 to the storage area 16, and deposit the BIW 14 on the storage rack 60 in a selected compartment 62 in step 140. The method of organization or position at which the AGV 40 deposits the BIW 14 on the storage rack 60 is preferably be based on the model style in step 125 or by color to be painted 130 to suit the particular application, plant process, performance specification or other factors known by those skilled in the art. In step 160, the BIWs are selectively engaged, for example by an AGV, removed from the storage rack 60 and bay 61 and transferred to the painting area 18 to achieve the desired random mix of vehicle bodies to paint.

As generally illustrated in FIGS. 9 and 10, since the AGV 40 can pass along axis 69 between the cantilevers 68 of the storage rack 60 in the direction from side-to-side of the compartments 62, the AGV 40 can travel to a furthest available column of compartments 62 in order to deposit the pallet 20 and BIW 14 in one of the compartments 62 in that column. The AGV 40 can then pickup another pallet 20 and BIW 14, and deposit that pallet 20 and BIW 14 in the same column of compartments 62, and the AGV 40 can repeat this procedure until that column of compartments 62 is full. Once that column of compartments 62 is full, the AGV 40 can deposit pallets 20 and BIWs 14 in the next furthest available column of compartments 62. By depositing pallets 20 and BIWs 14 in the furthest available column of compartments 62, the AGV 40 can avoid depositing pallets 20 and BIWs 14 at locations that would block its access to other compartments 62.

Also, the first pallet 20 and BIW 14 of a new group of pallets 20 and BIWs 14 (e.g., BIWs 14 of a new model or to be painted a new color) can be deposited at a furthest side of the frame 60 from where the depositing AGV 40 entered the frame 60 such that the pallet 20 and BIW 14 of the new group is accessible from an opposing side of the frame 60 from which the depositing AGV 40 entered the frame 60. For example, as shown in FIG. 10, AGVs 40 can enter the frame 60' from side 72 and can deposit pallets 20 and BIWs 14 as close as possible to opposing side 74. AGVs 40 can then remove pallets 20 and BIWs 14 from side 74. As a result, each group of BIWs 14 can be accessible for removal from the frame 60 if opposing sides of the frame 60 are used for depositing and removing pallets 20 and BIWs 14.

The vehicle body painting area 18 can include automated robots, workers, or other devices equipped to paint the BIWs 14. As mentioned earlier and as shown in FIG. 10, AGVs 40 can remove pallets 20 and BIWs 14 from the opposing side 74 of the frame 60' from the side 72 via which the pallets 20 and BIWs 14 are deposited. Removed pallets 20 and BIWs 14 can be transported by AGVs 40 to the painting area, and the BIWs 14 can be painted.

As mentioned, in an alternate example, the BIWs 14 can be stored and removed from the frame 60 in an order based on the color that the BIWs 14 are to be painted. For example, all BIWs 14 of a first model type to be painted a first color can be removed from the frame 60 and transported to the painting area 18, followed by all BIWs 14 of a second model type to be painted the first color, then all BIWs 14 of a third model type to be painted the first color, and so on. Next, the painting equipment at the painting area 18 can be reconfigured to supply a second color of paint. All BIWs 14 of the first model type to be painted the second color of paint can be removed from the frame 60 and transported to the painting area 18, followed by all BIWs 14 of the second model type to be painted the second color, then all BIWs 14 of the third model type to be painted the second color, and so on. The painting equipment at the painting area can be reconfigured a second time, if necessary, to supply a third color, and the process can continue.

The above-described examples have been described in order to allow easy understanding of the invention and do not limit the invention. On the contrary, the invention is intended to cover various modifications and equivalent arrangements, whose scope is to be accorded the broadest interpretation so as to encompass all such modifications and equivalent structure as is permitted under the law.

What is claimed:

1. A method of assembling and organizing vehicle bodies prior to painting the vehicle bodies, the method comprising the steps of:
   assembling a plurality of vehicle bodies of a first body style, followed by sequential assembly of at least a second body style in a sequence along an assembly line irrespective of a first color and a second color that the first and at least second body styles are to be respectively painted;
   transferring the assembled vehicle bodies to a storage area remote from the assembly line;
   storing the assembled bodies in a storage area;
   selectively transferring a plurality of the first and the at least second vehicle body styles to a painting area that are to be painted a first color; and
   subsequently selectively transferring a plurality of the assembled first and the at least second vehicle body styles to a painting area that are to be painted the second color thereby physically reordering the sequence of the vehicle bodies prior to painting.

2. The method of claim 1 wherein the step of transferring the vehicle bodies comprises the steps of engaging the vehicle body by an automated guided vehicle and moving the automated guided vehicle along a predetermined path from a body pickup point to a body delivery point.

3. The method of claim 1 further comprising the step of providing a vehicle body storage rack having a plurality of compartments, each compartment adapted for engaging receipt of a vehicle body.

4. The method of claim 3 wherein the step of storing the assembled vehicle bodies further comprises the step of organizing and storing the vehicle bodies in the storage rack by vehicle body style.

5. The method of claim 4 further comprising the step of storing the assembled vehicle bodies in a vertical orientation with respect to one another in multiple rows and columns to minimize the use of assembly plant floor space.

6. The method of claim 3 wherein the step of storing the assembled vehicle bodies further comprises the step of organizing and storing the vehicle bodies in the storage rack by the color that the stored vehicle bodies are to be painted.

7. A method of assembling and organizing vehicle bodies prior to painting the vehicle bodies, the method comprising the steps of:
   assembling a plurality of at least a first style of vehicle body and a second style of vehicle body in a batch sequence along an assembly line;
   engaging the vehicle body with an automated guided vehicle;
   sequentially transferring the assembled vehicle bodies of the first style and the second style from the assembly line to a vehicle body storage area;
   temporarily storing the assembled vehicle bodies of the first style and the second style in a body storage rack; and
   selectively and sequentially removing the first and the second vehicle body styles from the storage area and sequentially transferring the first and the second body styles to a painting area based on the color that the respective first and second body styles are to be painted in the painting area.

8. The method of claim 7 wherein the step of storing the assembled vehicle bodies further comprises the step of storing the respective vehicle bodies by body style such that there is a plurality of first body styles stored in close proximity and a plurality of second body styles stored in close proximity.

9. The method of claim 8 further comprising the step of providing a vertical storage rack having a plurality of vertically spaced compartments, each compartment adapted to receive a vehicle body.

10. The method of claim 9 further comprising the step of providing a plurality of storage racks positioned in a plurality of storage bays located in the storage area.

11. The method of claim 9 wherein the step of storing the vehicle bodies in a storage rack compartment comprises the step of centering the vehicle body in the storage compartment.

12. The method of claim 7 wherein transferring the assembled vehicle bodies further comprises:
   raising the vehicle body in a vertical direction;
   moving the vehicle body from the assembly line to the storage area;
   selectively raising or lowering the vehicle body relative to the storage rack; and
   depositing the vehicle body in a selected compartment of the storage rack.

13. The method of claim 12 wherein the automated guided vehicle axially engages a pallet supporting the vehicle body in a direction transverse to a longitudinal axis of the body.

14. A method of assembling and organizing vehicle bodies prior to painting the vehicle bodies, the method comprising the steps of:
   assembling a plurality of a first style of vehicle body in a batch sequence along an assembly line;
   assembling a plurality of a second style of a vehicle body in a batch sequence along the assembly line;

sequentially engaging the assembled first and the second style bodies with an automated guided vehicle (AGV) through transverse axial engagement of the AGV with a pallet supporting vehicle body relative to a longitudinal axis of the vehicle body;

sequentially transferring the respective vehicle bodies from the assembly line along a predetermined and pre-programmed AGV path to a vehicle body storage area;

providing a plurality of vehicle body storage racks positioned in the storage area, each storage racking having at least two vertically separated compartments, each compartment adapted for receipt of a vehicle body;

selectively raising or lowering the vehicle body to align the vehicle body with a selected storage compartment;

depositing the vehicle body in the selected storage rack compartment; and selectively and sequentially removing the first and the second vehicle body styles from the respective storage compartment and sequentially transferring the respective first and the second body styles to a painting area based on the color that the respective first and second body styles are to be painted in the painting area.

15. A method of assembling and organizing vehicle bodies prior to painting the vehicle bodies, the method comprising the steps of:

assembling a plurality of vehicle bodies in a sequence along an assembly line;

transferring the assembled vehicle bodies to a storage area remote from the assembly line by engaging the vehicle body by an automated guided vehicle and moving the automated guided vehicle along a predetermined path from a body pickup point to a body delivery point;

storing the assembled bodies in a storage area; and selectively transferring the vehicle bodies to a painting area according to the color that the selected vehicle bodies are to be painted.

* * * * *

UNITED STATES PATENT AND TRADEMARK OFFICE
CERTIFICATE OF CORRECTION

PATENT NO. : 8,713,799 B2  
APPLICATION NO. : 12/760146  
DATED : May 6, 2014  
INVENTOR(S) : Velibor Kilibara Page 1 of 1

It is certified that error appears in the above-identified patent and that said Letters Patent is hereby corrected as shown below:

Title Page under item (12) United States Patent: Delete "Kllibarda" and insert -- Kilibara --.

Title Page item (75) Inventor: Delete "Vellbor Kllibarda" and insert -- Velibor Kilibara. --.

Signed and Sealed this  
Twenty-ninth Day of July, 2014

Michelle K. Lee  
*Deputy Director of the United States Patent and Trademark Office*